United States Patent
Akhter et al.

(10) Patent No.: US 8,892,745 B2
(45) Date of Patent: Nov. 18, 2014

(54) REDIRECTION OF A REQUEST FOR INFORMATION

(75) Inventors: Aamer S. Akhter, Cary, NC (US);
Arivu Mani Ramasamy, San Jose, CA (US); Derek L. Huckaby, Dunwoody, GA (US)

(73) Assignee: Cisco Technology, Inc., San Jose, CA (US)

(*) Notice: Subject to any disclaimer, the term of this patent is extended or adjusted under 35 U.S.C. 154(b) by 517 days.

(21) Appl. No.: 12/413,845

(22) Filed: Mar. 30, 2009

(65) Prior Publication Data

US 2010/0250757 A1    Sep. 30, 2010

(51) Int. Cl.
*G06F 15/16* (2006.01)
*H04L 29/08* (2006.01)

(52) U.S. Cl.
CPC ........ *H04L 67/2814* (2013.01); *H04L 67/1002* (2013.01)
USPC ........... 709/227; 709/218; 709/224; 709/230; 709/232; 709/238; 718/105

(58) Field of Classification Search
CPC ............ H04L 67/1002; H04L 67/1014; H04L 67/1023; H04L 67/2814; H04L 67/2819; H04L 69/22
USPC ......... 709/202–205, 217–233, 238, 242–244; 718/105
See application file for complete search history.

(56) References Cited

U.S. PATENT DOCUMENTS

| | | | |
|---|---|---|---|
| 6,202,169 B1 * | 3/2001 | Razzaghe-Ashrafi et al. | 714/6.31 |
| 6,205,477 B1 * | 3/2001 | Johnson et al. | 709/220 |
| 6,603,769 B1 * | 8/2003 | Thubert et al. | 370/401 |
| 6,760,775 B1 * | 7/2004 | Anerousis et al. | 709/238 |
| 6,813,635 B1 * | 11/2004 | Jorgenson | 709/225 |
| 6,857,012 B2 | 2/2005 | Sim et al. | |
| 6,886,035 B2 * | 4/2005 | Wolff | 709/219 |
| 7,032,037 B2 | 4/2006 | Garnet et al. | |
| 7,177,270 B2 | 2/2007 | Sim et al. | |
| 7,321,926 B1 | 1/2008 | Zhang et al. | |
| 7,328,237 B1 | 2/2008 | Thubert et al. | |
| 7,336,613 B2 | 2/2008 | Lloyd et al. | |
| 7,340,532 B2 | 3/2008 | Swildens | |

(Continued)

OTHER PUBLICATIONS

IOS Server Load Balancing, Cisco available Jan. 30, 2001, updated Dec. 12, 2003.*

(Continued)

*Primary Examiner* — David Lazaro
*Assistant Examiner* — Sarah Drabik
(74) *Attorney, Agent, or Firm* — Patent Capital Group

(57) ABSTRACT

A method is provided in one example embodiment and includes identifying a first data center configured to receive a request initiated by an end user. The method also includes detecting a presence of a wide area application service (WAAS) and identifying a second data center. The method further includes signaling, in response to the presence of the WAAS, to redirect data packets associated with the request to the second data center. In more specific embodiments, the signaling includes adding a TCP option to packets of a session associated with the end user to inform components of redirecting capabilities of a WAAS element. The detecting can include recognizing a transmission control protocol (TCP) option in detecting the presence of the WAAS. The TCP option can be used to identify capabilities of a WAAS element that is involved in servicing the request of the end user.

14 Claims, 2 Drawing Sheets

(56) References Cited

U.S. PATENT DOCUMENTS

| | | | |
|---|---|---|---|
| 7,463,648 B1 | 12/2008 | Eppstein et al. | |
| 7,590,736 B2* | 9/2009 | Hydrie et al. | 709/226 |
| 7,984,160 B2* | 7/2011 | Lam | 709/227 |
| 8,040,808 B1* | 10/2011 | Kasturi et al. | 370/238 |
| 8,065,559 B2* | 11/2011 | Kamath et al. | 714/10 |
| 2002/0156893 A1* | 10/2002 | Pouyoul et al. | 709/225 |
| 2003/0041141 A1* | 2/2003 | Abdelaziz et al. | 709/223 |
| 2003/0051021 A1* | 3/2003 | Hirschfeld et al. | 709/223 |
| 2004/0098447 A1* | 5/2004 | Verbeke et al. | 709/201 |
| 2006/0212935 A1* | 9/2006 | Burman et al. | 726/12 |
| 2006/0271671 A1* | 11/2006 | Hansen | 709/224 |
| 2007/0038853 A1* | 2/2007 | Day et al. | 713/153 |
| 2007/0174660 A1* | 7/2007 | Peddada | 714/4 |
| 2007/0250626 A1* | 10/2007 | Phan | 709/225 |
| 2008/0133692 A1* | 6/2008 | Holt | 709/212 |
| 2008/0281908 A1* | 11/2008 | McCanne et al. | 709/203 |
| 2009/0016335 A1* | 1/2009 | Bays | 370/389 |
| 2009/0089699 A1* | 4/2009 | Saha et al. | 715/771 |
| 2010/0036954 A1* | 2/2010 | Sakata et al. | 709/226 |
| 2010/0098092 A1* | 4/2010 | Luo et al. | 370/401 |
| 2010/0318665 A1* | 12/2010 | Demmer et al. | 709/227 |

OTHER PUBLICATIONS

Gossamer Threads, Nov. 2007 entitled WAAS; posts 1-4.*
GossamerThreads, WAAS, Nov. 2007, retrieved from <http://www.gossamer-threads.com/lists/cisco/nsp/75216?do=post_view_flat#75216>.*
GossamerThreads, WAAS, Nov. 2007, retrieved from <http://www.gossamer-threads.com/lists/cisco/nsp/75216?do=post_view_flat#75216>.*
Cisco, "IOS Server Load Balancing", available Jan. 30, 2001, updated Dec. 12, 2003.*

* cited by examiner

REDIRECTION OF A REQUEST FOR INFORMATION

TECHNICAL FIELD OF THE INVENTION

The present disclosure relates generally to communications and, more particularly, to redirection of a request for information.

BACKGROUND OF THE INVENTION

Data distribution services have become increasingly important in today's society. In certain architectures, service providers may seek to offer optimal data services for their end users. Distributed data centers having multiple sites are gaining market acceptance due to their high availability. These centers can also offer geographic proximity, which can result in low latency and, thereby, provide better fault mitigation and loadsharing. Some distributed data centers have the ability to service client requests concurrently using distinct data centers.

BRIEF DESCRIPTION OF THE DRAWINGS

In order to provide a better understanding, example embodiments will now be described in detail, by way of example only, with reference to the accompanying figures, in which.

DETAILED DESCRIPTION OF EXAMPLE EMBODIMENTS

Overview

A method is provided in one example embodiment and includes identifying a first data center configured to receive a request initiated by an end user. The method also includes detecting a presence of a wide area application service (WAAS) and identifying a second data center. The method further includes signaling, in response to the presence of the WAAS, to redirect data packets associated with the request to the second data center. In more specific embodiments, the signaling includes adding a TCP option to packets of a session associated with the end user to inform components of redirecting capabilities of a WAAS element. The detecting can include recognizing a transmission control protocol (TCP) option in detecting the presence of the WAAS. The TCP option can be used to identify capabilities of a WAAS element that is involved in servicing the request of the end user.

Figure 1:
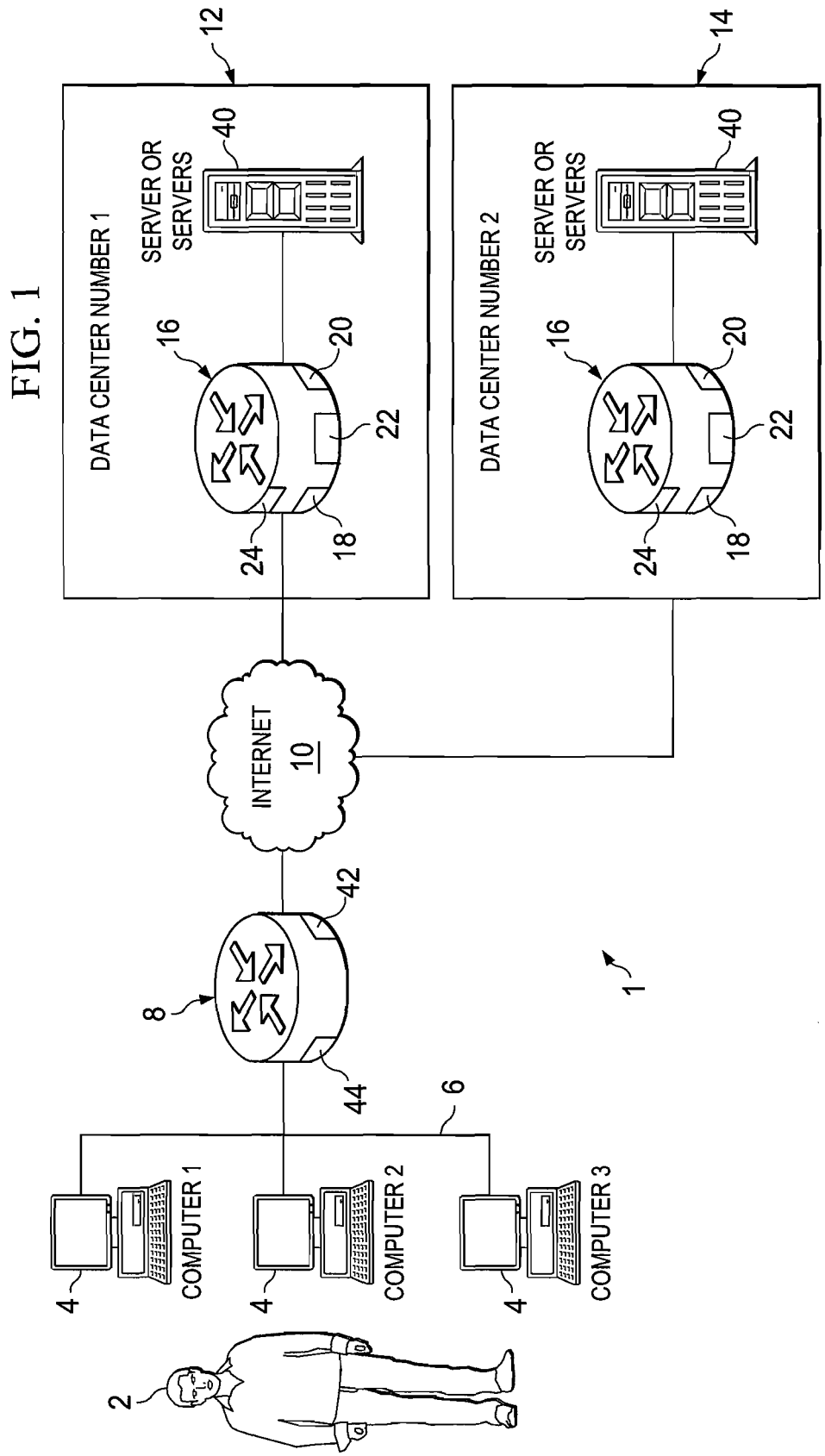
FIG. 1 is a simplified example block diagram of one embodiment of a system for transparently redirecting a client.

FIG. 1 is a simplified example block diagram of one embodiment of a system 1 for transparently redirecting a client. In this embodiment, a user 2 has an associated personal computer 4, which is a client of a first data center 12 (e.g., data center #1). While in the present embodiment the client is a personal computer, the client may be any type of electronic device (a laptop, a wireless handheld device, a cellular telephone, an I-Phone, etc.), which is arranged to communicate to a data center that may be part of a core system of an enterprise. In one embodiment, the client is connected via a local area network (LAN) 6 to an ingress device 8, which may incorporate some of the functions of a router, a bridge, a server, and/or a wide area network optimization module such as a WAAS (Wide Area Application Services) product, for example. Ingress device 8 can be connected to a wide area network to facilitate a connection to an Internet 10. Generally, user 2 can initiate or otherwise trigger personal computer 4 to seek information from a remote data center, such as data center 12. For example, the client may be running a web browser that prompts ingress device 8 for a connection to be established with an egress device 16 at data center 12 such that a web page is served from data center 12. Egress device 16 can connect a collection of servers 40 to Internet 10. When the ingress and egress device are connected, for example, they are in communication.

Figure 3:
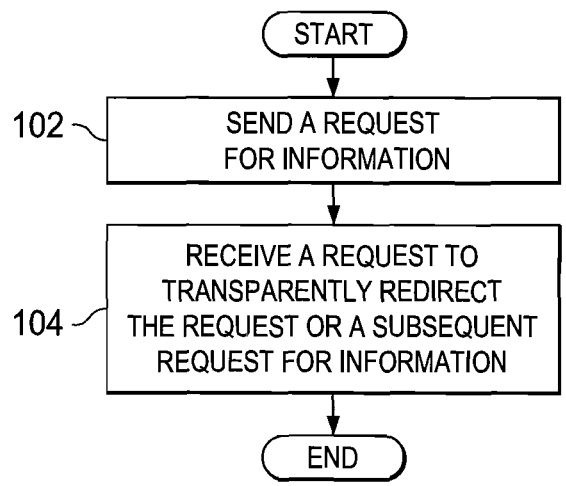
FIG. 3 is an example flow diagram of one embodiment of a method of transparently redirecting a client.
Figure 4:
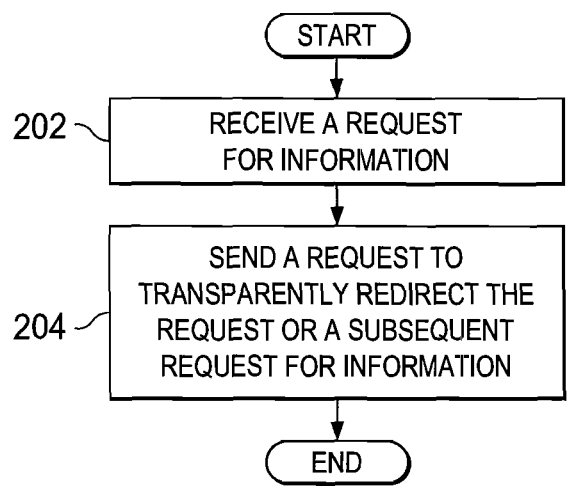
FIG. 4 is an example flow diagram of another embodiment of a method of transparently redirecting a client.

In this embodiment, an attempt is made to establish a Transmission Control Protocol (TCP)/Internet Protocol (IP) connection over the physical network. Ingress device 8, on prompting by the client, sends a request for information (and represents the request as being initiated by a sender through a transmission interface 44) for a connection to egress device 16 at data center 12. The request for a connection is a request for information. In this embodiment, these actions are represented as step 102 of the method of transparently redirecting a client shown in FIG. 3. Egress device 16, in this embodiment, receives the request for a connection (shown as step 202 of the example method in FIG. 4), which is a request for information and may, depending on the circumstances, accept the request for a connection and the supply of the information required. In this case, ingress device 8 and egress device 16 establish a TCP/IP connection.

Alternatively, egress device 16 may send a different request back to ingress device 8 to transparently redirect the request for information to another data center such as a data center 14 (e.g., data center #2). In this embodiment, these actions are represented as step 204 in FIG. 4. Features of data center 14 similar to the features of data center 12 are similarly numbered. A redirection request may occur, for example, if the original data center 12 is not fully operational, faulty, or has poor performance for reasons such as heavy usage. Typically in this case, egress device 16 will first receive, together with the request for a connection, confirmation from ingress device 8 that it can indeed transparently redirect the request for information. This confirmation may be typically received as a TCP option, such as option 0x21.

In this embodiment, egress device 16 includes an information request receiver 18 for receiving the request for a connection or a subsequent request information. It also includes a transparent redirection request sender 20 for sending [to ingress device 8] a request to transparently redirect the request for a connection or a subsequent request for information. A confirming element 22 of egress device 16 is provided to confirm that the TCP option indicating the availability of a transparent redirection by ingress server 8 is present. A transparent redirection request sender 24 of egress device 16 sends a request to ingress device 8 to transparently rewrite and reestablish a data connection when required.

Sometimes, the request to transparently redirect the request for information or a subsequent request for information may be sent within an existing session. This may occur, for example, if there is a spike in the number of requests for information from data center 12. Redirection may occur after a transaction, for example after the sending of a JPEG file from a group of servers 40 to the client. If data center 12 is particularly busy, for example, the transparent redirection request sender 24 may send a request to ingress device 8 to transparently redirect all requests for a connection, or information for a specified time interval or period [e.g., for the next four hours].

Ingress device 8, in this embodiment, includes a transparent redirection request receiving interface 42, which receives the request from egress device 16 to transparently redirect the request to the alternative data center [data center #2]. In this embodiment, these actions are represented by step 104 in FIG. 3. Upon receiving this request, ingress device 8 can attempt to perform network transparent proxying by redirecting the request for a connection or information to data center 14 without notifying or providing hints of the redirection (such as altered layer addressed) to the client. Egress device 16 of the alternative data center may then consider the request as per the original data center.

In this embodiment, ingress device 8, in setting up the redirected connection to the alternate data center, preserves the level 3 (network layer) and 4 (transport layer) addresses of the original egress device 16 to provide network transparency. Thus, ingress device 8 acts in some ways like a transparent or intercepting proxy server without providing any information to the client that a redirection has taken place.

Figure 2:
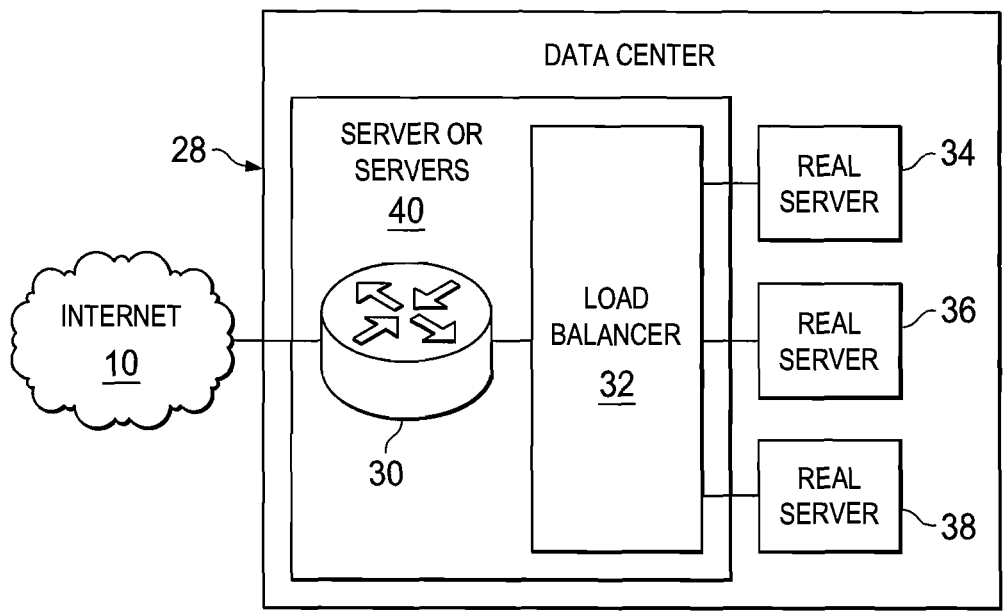
FIG. 2 is a simplified example block diagram of one embodiment of a data center.

FIG. 2 shows another example embodiment of an egress device or system with similar or identical functionality to egress devices 16. It forms part of a data center 28. Servers 40 may include (or be coupled to) a WAN optimization module such as a WAAS element 30 connected to a server loadbalancer 32 that may include, for example, an Application Control Engine (ACE) module. Server loadbalancer 32, in this embodiment, abstracts multiple real servers such as 34, 36, and 38 within data center 28. Server loadbalancer 32 provides a single virtual IP address, which is the L3 address to which the client publicly connects. Server loadbalancer 32 directs the connection to real server 34, 36, 38 that it believes is best capable of meeting the client request. The session is bound between the client and server loadbalancer 32, and via server loadbalancer 32 to real servers 34, 36, and 38. Server loadbalancer 32 is aware of a WAN optimization module (e.g., within WAAS element 30) and is capable of signaling it to send a request to ingress device 8 to transparently redirect traffic to an alternative data center such as data center #2 (14).

In an embodiment, a dynamic form of the WAN optimization module discovery is built into the sessions. An additional TCP option (0x21) is added by ingress device 8 that is recognized by the egress WAN optimization module. The TCP option informs the module of the transparent redirection capabilities of ingress device 8. That is, the TCP option can act as an embedded control channel to be used to check for the capabilities of ingress device 8. As the WAN optimization module does not know that it was the last module in the network path, the 0x21 TCP option is retained downstream.

In this embodiment, redirection is handled at connection setup because once a transaction starts some state has been created on the real server such as real server 34. The problem of cleanly transferring that state to another data center is avoided. However, in some embodiments this will not be the case. In some embodiments, server loadbalancer 32 (potentially inclusive of the ACE) is highly aware of the session state and is able to provide hints of the state in the form of, for example, cookie information to ingress device 8.

Ingress device 8 can have functions of a transparent redirection proxy. The transparent redirecting proxy function may be programmed into an existing router, for example a router running an Internetwork Operating System (IOS) component. However, a WAAS ingress device is a convenient place for locating the transparent redirect proxy function because a WAAS element, for example, may already form a proxy between the WAN leg and the client side leg of a connection. This form of proxying does not change the L-3 and L-4 headers but does change the actual payload on the network into an optimized form. The WAAS discovery mechanism described above also provides identification, as well as a communications channel for server loadbalancer 32 to relay a redirection.

In embodiments including WAAS WAN optimization modules, server loadbalancer 32 accepts a SYN (Synchronization Packet) with 0x21 TCP option, and responds back via SYN-ACK (Synchronization Packet Acknowledgement) to the ingress WAAS element. Ingress WAAS element receives the redirect request from the original data center server loadbalancer and transparently establishes a connection to an alternative data center 14. The client is unaware of the redirection to the alternate data center. Server loadbalancer 32 may, in some embodiments, send a classification list such that future new connections going through the ingress WAAS element are proxied on initialization without having the initial data center in the setup path at all. The alternative data center can send a cancellation message to clear the ingress WAAS state once the first data center is back in good condition.

In WAN technologies, one recurring objective is to optimize L4-L7 sessions [e.g., between a branch and a data center] through the WAN-optimization module. One such product can insert itself between the client and the data center and perform network transparent proxying. Example embodiments presented herein can offer intelligence such that a server loadbalancer module is aware of the WAAS: some of which may be embodied in one or more WAAS products. Such implementations can include signaling to a branch WAAS element to transparently direct traffic to another other data center.

Thus, certain WAAS products can use this idea of network transparency, which can operate to preserve the L3 and L4 addresses of a session between ingress and egress WAAS elements. Because of a lack of a tunnel present, a dynamic form of WAAS discovery is built into the sessions when the sessions pass through a WAAS wide-area application engine (WAE). An additional TCP option (0x21) can be added by the ingress WAAS element that is recognized by the egress WAAS element, which informs it of the capabilities of the ingress WAAS element.

In accordance with example embodiments, loadbalancer 32 (or a corresponding module therein) can recognize the 0x21 TCP option and realize that there is a WAAS element on the other side. This embedded control channel can be used to check the capabilities of the ingress WAAS element. If the WAAS element is deemed capable, loadbalancer 32 can (e.g., when the data center is out of capacity) indicate (e.g., to an edge WAAS element) to transparently rewrite and reestablish (i.e. setup) the connection. This would break network transparency by changing the L3 destination to the other data center VIP.

Note that there are some additional items that can enhance the proposed example implementations presented above. For example, loadbalancer 32 can send down a classification list such that future new connections going through the ingress WAAS element can be proxied at the initial time without putting data center #1 in the setup path. Data center #2 can send down an unbind message to clear the ingress WAAS state once data center #1 is back in good (e.g., working) condition. In addition, if loadbalancer 32 was more transaction aware (e.g., in the case of a loadbalancer-XML scenario), then it could intelligently send down (e.g., to the ingress WAAS element) the redirection information at the end of a transaction in a long-standing connection. The end of the transaction is a good time for a clean transfer of the session to data center #2 without any loss of state. Additionally, considering how much the server loadbalancer is aware of the session state, it may be able to provide hints (e.g., cookie information) to the WAAS element, which can pass to the data center #2 loadbalancer to reestablish the connection.

Note also that, in example embodiments, it is not required that the WAAS element be the transparent redirect-proxy (e.g., this could be done purely in the interwork operating system (IOS)), but it is currently a convenient place, as the WAAS element is already doing a form of proxying between a WAN leg and the client side leg of a connection. This form of proxying does not necessarily change the L3 and L4 headers, but it can change the actual payload on the wire into an optimized form. The WAAS discovery mechanism can also provide identification, as well as a communications channel for loadbalancer 32 to relay its redirection needs. Currently loadbalancer 32 can be used to provide a scalable WAAS solution. There is a high likelihood of finding both the loadbalancer and WAAS element in the same data path.

Thus, when WAN-optimization modules are in the path to a multi-server loadbalancer system, a single server loadbalancer can direct the ingress WAN-optimization module to transparently rebuild the TCP session to a better server loadbalancer in another data center. In this manner, an end user is not disrupted with an HTTP redirection. In addition, the TCP session is not proxied via the original data center, but can go to a final data center (e.g., after 'TCP redirection' optimization is done) directly from the branch and this results in a more resilient system. Example embodiments can also achieve a bandwidth reduction in the original data center. In addition, employing certain example implementations allow for future TCP sessions of a similar type being preemptively sent to better data center.

In one example embodiment, loadbalancer 32 is collocated with (or coupled to) a server, as outlined above. In other embodiments, this loadbalancer is its own separate independent element. Loadbalancer 32 is a network element and, as used herein in this Specification, the term 'network element' is meant to encompass routers, switches, any type of gateways, bridges, loadbalancers, firewalls, or any other suitable device, component, element, or object operable to exchange information in a network environment. Moreover, loadbalancer 32 may include any suitable hardware, software, components, modules, interfaces, or objects that facilitate the operations thereof. This may be inclusive of appropriate algorithms and communication protocols that allow for the effective exchange of data or information.

One or more tables may also be included in loadbalancer 32. In other embodiments, these tables may be provided externally to loadbalancer 32, or consolidated in any suitable fashion. The tables can be memory elements for storing information to be referenced by their corresponding loadbalancer 32. As used herein in this document, the term 'table' is inclusive of any suitable database or storage medium (provided in any appropriate format) that is capable of maintaining information pertinent to the redirection and/or processing operations of the proposed architecture. For example, the tables may store information in an electronic register, diagram, record, index, list, or queue. Alternatively, the tables may keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

In one example implementation, loadbalancer 32 includes software to achieve the redirection operations, as outlined herein in this document. In other embodiments, this feature may be provided external to loadbalancer 32 or included in some other network element to achieve this intended functionality. Alternatively, both loadbalancer 32 and some other network appliance include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving redirection in a network environment. For example, in one example implementation, loadbalancer 32 may include a communications interface (configured to transmit/receive datagrams, IP packets, cells, etc.) to/from some other component, module, or interface [either internally or external to loadbalancer 32]. In a similar vein, any of the activities associated with signaling, detecting, adding the TCP option, recognizing which data center is capable of handling an incoming request, etc. can be included in a detection module provided in loadbalancer 32. Such a module may include a processor and a memory, which together can execute some code (i.e., software) for achieving the operations outlined herein.

Loadbalancer 32 (e.g., the media gateway) can also include memory elements for storing information to be used in achieving the redirection activities, as outlined herein. Additionally, each loadbalancer 32 may include a processor (or multiple processors) that can execute software or an algorithm associated with the redirection activities, as discussed in this Specification. Loadbalancer 32 may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the proffered system (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the steps outlined above illustrate only some of the possible scenarios that may be executed by, or within, the system. Some of these steps may be deleted or removed where appropriate, or these steps may be modified or changed considerably without departing from the scope of the described concept. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the proffered architecture in that any suitable arrangements, chronologies, configurations, and timing mechanisms may be provided without departing from the teachings of the described concept.

Although the described concept has been described in detail with reference to particular arrangements and configurations, these example configurations and arrangements may be changed significantly without departing from the scope of the described concept. For example, although the described concept has been described with reference to particular communication exchanges involving certain protocols and data center environments, the system may be applicable to other protocols in which packets (not necessarily the packets described) are exchanged in order to provide redirection for one or more endpoints. Moreover, the presented system may be applicable to any suitable element or component within the network that seeks to control redirection activities.

Numerous other changes, substitutions, variations, alterations, and modifications may be ascertained to one skilled in the art and it is intended that the described concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
a processor;
a communications interface configured to communicate with a first data center;
a detection module configured to detect a presence of a wide area application service (WAAS), wherein the presence of the WAAS allows for a signal to redirect data packets associated with a request from the first data center to a second data center, and wherein the detection module is configured to recognize a transmission control protocol (TCP) option in detecting the presence of the WAAS;
a WAAS element coupled to the communications interface, wherein a classification list is communicated to the WAAS element such that new connections are proxied initially at setup in order to remove the first data center from a setup path, wherein an unbind message is sent to clear an ingress WAAS state once the first data center returns to a working condition; and
a load balancer that stores tables for maintaining information pertinent to redirection operations, wherein the load balancer communicates cookie information to the WAAS element to be passed to the second data center after redirection to establish a redirected connection;
wherein the WAAS element can preserve L3 and L4 address information of a session during redirection of a data packet associated with the request to the second data center and changes a payload of the data packet associated with the request into an optimized form.

2. The apparatus of claim 1, wherein the communications interface is configured to be coupled to one or more servers that service one or more requests, and wherein incoming requests are distributed to the servers.

3. The apparatus of claim 1, wherein the WAAS element includes a wide area application engine (WAE) that adds the TCP option to packets of the session to inform components downstream of the WAAS element of its redirecting capabilities.

4. The apparatus of claim 1, wherein the TCP option is used to identify capabilities of the WAAS element that is involved in servicing the request.

5. The apparatus of claim 4, wherein the detection module is configured to instruct the WAAS element to transparently reestablish a connection associated with the request.

6. The apparatus of claim 1, wherein the redirection is executed using an interwork operating system (IOS) element.

7. A method, comprising:
identifying a first data center configured to receive a request initiated by an end user;
detecting a presence of a wide area application service (WAAS) by recognizing a transmission control protocol (TCP) option;
identifying a second data center;
storing in a load balancer information pertinent to redirection operations;
signaling, in response to the presence of the WAAS, to redirect data packets associated with the request from the first data center to the second data center; and
communicating a classification list to a WAAS element such that new connections are proxied initially at setup in order to remove the first data center from a setup path, wherein an unbind message is sent to clear an ingress WAAS state once the first data center returns to a working condition; and
communicating from the load balancer cookie information to the WAAS element to be passed to the second data center after redirection to establish a redirected connection;
wherein the WAAS element can preserve L3 and L4 address information of a session during redirection of a data packet associated with the request to the second data center and changes a payload of the data packet associated with the request into an optimized form.

8. The method of claim 7, wherein the signaling comprises adding the TCP option to packets of a session associated with the end user to inform components of redirecting capabilities of the WAAS element.

9. The method of claim 7, wherein the TCP option is used to identify capabilities of the WAAS element that is involved in servicing the request of the end user.

10. The method of claim 9, wherein the signaling comprises instructing the WAAS element to transparently reestablish a connection associated with the request.

11. Tangible non-transitory media for execution and when executed by a processor being operable to:
identify a first data center configured to receive a request initiated by an end user;
detect a presence of a wide area application service (WAAS) by recognizing a transmission control protocol (TCP) option;
identify a second data center;
store in a load balancer information pertinent to redirection operations;
signal, in response to the presence of the WAAS, to redirect data packets associated with the request from the first data center to the second data center; and
communicate a classification list to a WAAS element such that new connections are proxied initially at setup in order to remove the first data center from a setup path, wherein an unbind message is sent to clear an ingress WAAS state once the first data center returns to a working condition; and communicate from the load balancer cookie information to the WAAS element to be passed to the second data center after redirection to establish a redirected connection;

wherein the WAAS element can preserve L3 and L4 address information of a session during redirection of a data packet associated with the request to the second data center and changes a payload of the data packet associated with the request into an optimized form.

12. The media of claim 11, wherein the signaling comprises adding the TCP option to packets of a session associated with the end user to inform components of redirecting capabilities of the WAAS element.

13. The media of claim 11, wherein the TCP option is used to identify capabilities of the WAAS element that is involved in servicing the request of the end user.

14. The media of claim 13, wherein the signaling comprises instructing the WAAS element to transparently reestablish a connection associated with the request.

* * * * *